(12) United States Patent
Chiu et al.

(10) Patent No.: US 12,392,437 B2
(45) Date of Patent: Aug. 19, 2025

(54) QUICK COUPLING SET

(71) Applicant: Wistron Corporation, New Taipei (TW)

(72) Inventors: Jui-An Chiu, New Taipei (TW); Hsin-Tzu Chen, New Taipei (TW); Wei-Ting Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 17/990,750

(22) Filed: Nov. 21, 2022

(65) Prior Publication Data

US 2024/0027009 A1    Jan. 25, 2024

(30) Foreign Application Priority Data

Jul. 19, 2022   (TW) ................... 111126966

(51) Int. Cl.
*F16L 37/244* (2006.01)
*F16L 37/24* (2006.01)

(52) U.S. Cl.
CPC ............. *F16L 37/244* (2013.01); *F16L 37/24* (2013.01); *F16L 2201/10* (2013.01)

(58) Field of Classification Search
CPC ........ F16L 37/24; F16L 37/248; F16L 37/107
See application file for complete search history.

(56) References Cited

U.S. PATENT DOCUMENTS

| | | | | |
|---|---|---|---|---|
| 554,666 | A | * | 2/1896 | Feltner ............... F16L 37/248 285/259 |
| 3,980,325 | A | * | 9/1976 | Robertson ........... F16L 37/248 285/382.7 |
| 4,655,482 | A | * | 4/1987 | Myers ................ F16L 37/248 285/85 |
| 5,083,819 | A | * | 1/1992 | Bynum ............... F16L 37/248 285/315 |
| 5,188,398 | A | * | 2/1993 | Parimore, Jr. ....... F16L 37/248 285/86 |
| 6,293,595 | B1 | * | 9/2001 | Marc ................. F16L 37/248 285/86 |
| 6,957,833 | B2 | * | 10/2005 | Guest ................ F16L 37/0925 285/376 |
| 7,032,931 | B2 | * | 4/2006 | Austin ............... F16L 19/005 439/321 |
| 7,905,741 | B1 | * | 3/2011 | Wade ................ H01R 13/639 439/321 |

(Continued)

FOREIGN PATENT DOCUMENTS

| CN | 103688000 B | 5/2016 | |
|---|---|---|---|
| CN | 112483747 A | * 3/2021 | ........... F16L 37/248 |

(Continued)

*Primary Examiner* — Matthew Troutman
*Assistant Examiner* — Fannie Kee
(74) *Attorney, Agent, or Firm* — Winston Hsu

(57) ABSTRACT

A quick coupling set includes a socket and a mating plug. The socket has a rotation-restraining structure while the mating plug has a mating rotation-restraining structure. In the coupling of the socket and the mating plug, the rotation-restraining structure of the socket only allows the rotation-restraining structure of the mating plug to relatively rotate in a rotation direction, so as to complete the coupling of the socket and the mating plug.

14 Claims, 15 Drawing Sheets

(56) References Cited

U.S. PATENT DOCUMENTS

| | | | | |
|---|---|---|---|---|
| 8,992,148 | B2* | 3/2015 | Schafer | F16L 19/005 |
| | | | | 439/321 |
| 9,440,246 | B2* | 9/2016 | Meehan | F16L 37/248 |
| 2004/0127084 | A1* | 7/2004 | Glennie | F16L 37/248 |
| | | | | 439/316 |
| 2007/0252386 | A1* | 11/2007 | Cress | F16L 37/248 |
| | | | | 285/209 |
| 2012/0267456 | A1* | 10/2012 | Imagawa | F16L 37/248 |
| | | | | 285/86 |
| 2013/0020794 | A1 | 1/2013 | Stokes | |
| 2014/0261818 | A1* | 9/2014 | Cruickshank | F16L 37/248 |
| | | | | 285/330 |
| 2014/0265312 | A1* | 9/2014 | McAlister | F16L 19/005 |
| | | | | 285/305 |
| 2021/0085951 | A1* | 3/2021 | Iwakata | F16L 37/248 |
| 2021/0254769 | A1* | 8/2021 | Jenski, Jr. | F16L 37/248 |

FOREIGN PATENT DOCUMENTS

| | | | | | |
|---|---|---|---|---|---|
| DE | 102016106485 | A1 | * | 10/2017 | ............ F16L 37/248 |
| DE | 102017203915 | A1 | * | 9/2018 | ............ F16L 37/248 |
| EP | 0716261 | A2 | * | 6/1996 | ............ F16L 37/248 |
| KR | 20080002709 | U | * | 7/2008 | ............ F16L 37/248 |
| TW | M527564 | U | | 8/2016 | |

\* cited by examiner

QUICK COUPLING SET

BACKGROUND OF THE INVENTION

1. Field of the Invention

The present disclosure relates to a quick coupling, and more particularly to a quick coupling with an anti-misconnection function.

2. Description of the Prior Art

The connection operation of common quick couplings is simpler and faster than the operation of the traditional connectors that are engaged by means of screws, nuts, etc., and the quick couplings have been widely used in the connection of various fluid pipelines. Generally, in the same pipeline system, quick couplings of the same specification are often used, but there are still design requirements for the flow direction of the fluid in each pipeline of the pipeline system. For example, the coolant in the water-cooled plate needs to flow in a specific flow direction to achieve the expected heat exchange efficiency. If there is a misconnection, that is, the pipeline for supplying coolant is connected to the outlet of the water-cooled plate, and the pipeline for recovering the coolant is connected to the inlet of the water-cooled plate, the heat exchange efficiency of the water-cooled plate will be greatly reduced. Generally speaking, in order to avoid this situation, labels can be pasted on the quick couplings and the inlet and outlet of the water-cooled plate for operators to identify. However, this solution requires the operator to actively identify the labels. If the operator neglects to identify the labels, or the operating environment is insufficiently lit, misconnection may still occur.

SUMMARY OF THE INVENTION

An objective of the present application is to provide a quick coupling set and its socket and plug. Through the structural match of rotation-restraining structures on the socket and plug, the effect of preventing misconnection can be achieved.

A quick coupling set according to the present application includes a plug and a socket. The plug includes a plug body, a driving part, and a first rotation-restraining structure. The driving part and the first rotation-restraining structure are disposed on the plug body. The driving part is movably disposed on the plug body. The first rotation-restraining structure is disposed on the driving part. The socket includes a socket body and a second rotation-restraining structure disposed the socket body. The first socket and first plug structurally match each other. The first rotation-restraining structure is restrained by the second rotation-restraining structure to rotate relative to the second rotation-restraining structure in a rotation direction. Therefore, the plug and the socket can ensure correct connection therebetween through the motion restraint between the first rotation-restraining structure and the second rotation-restraining structure. On the other hand, if the rotation-restraining structure of another plug is different from the first rotation-restraining structure, this rotation-restraining structure cannot rotate in the rotation direction relative to the second rotation-restraining structure even though the other plug is inserted into the socket; therefore, this plug is unable to make a firm and effective connection with the socket. In other words, the structural match of the first rotation-restraining structure and the second rotation-restraining structure has the effect of preventing misconnection.

A plug according to the present application is used for connecting with a mating socket. The plug includes a plug body, a driving part, and a first rotation-restraining structure. The driving part is movably disposed on the plug body. The first rotation-restraining structure is disposed on the driving part. Therein, the first rotation-restraining structure is restrained by a second rotation-restraining structure of the mating socket to rotate relative to the second rotation-restraining structure in a rotation direction. Thereby, the plug can only be correctly inserted into the matching socket and rotate smoothly, so as to complete a firm and effective connection with the matching socket.

A socket according to the present application is used for connecting with a mating plug. The socket includes a socket body and a second rotation-restraining structure disposed on the socket body. Therein, a first rotation-restraining structure of the mating plug is restrained by the second rotation-restraining structure to rotate relative to the second rotation-restraining structure in a rotation direction. Thereby, the socket can only allow the mating plug to be inserted into and rotate smoothly, so as to complete a firm and effective connection with the mating plug.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
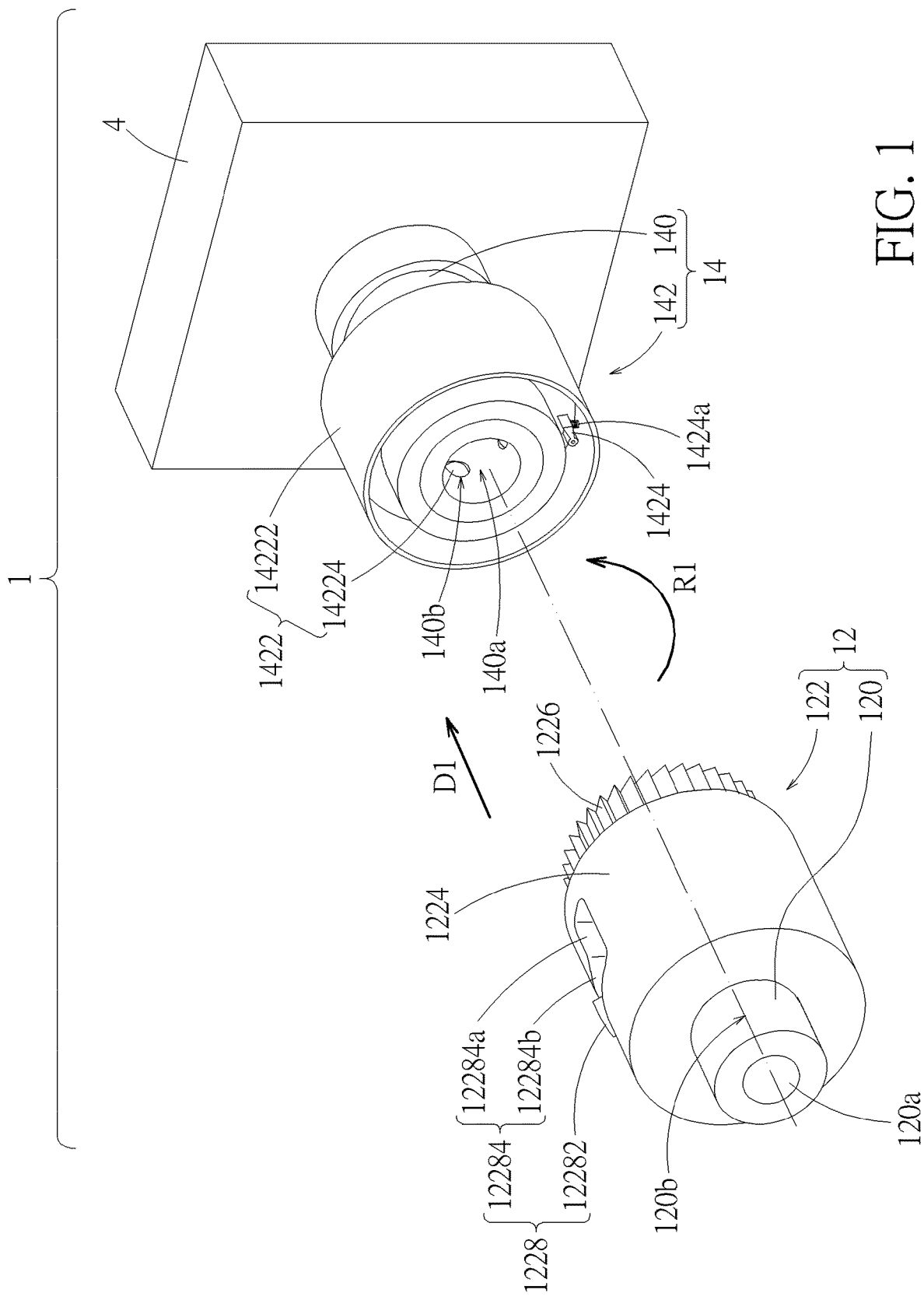
FIG. 1 is a schematic diagram illustrating a first quick coupling set of a first embodiment according to the present application.

In the following embodiments, ordinal terms, such as first, second, . . . etc., can be used to describe various elements, but the elements are not limited by the definitions of ordinal terms. The ordinal terms are used to distinguish elements in the specification. The ordinal terms of the elements in the claims are arranged in the order of the claims, which may be different from the ordinal terms of the elements in the specification. Thus, the first element described in the following description may be the second element in the claims.

Please refer to FIG. 1 to FIG. 4. A first quick coupling set 1 of a first embodiment according to the present application includes a first plug 12 and a first socket 14 matching the first plug 12. For the convenience of explanation and simplification of the drawings, the structures of the first plug 12 and the first socket 14 are simply shown in the figures, and in practice can be modified according to the implementation situation, such as structures for sealing, connecting with pipes, etc., which will not be described in addition. In the first embodiment, the first plug 12 includes a first plug body 120 and a first plug engagement structure 122 disposed on the first plug body 120. The first socket 14 includes a first socket body 140 and a first socket engagement structure 142 disposed on the first socket body 140. The first socket engagement structure 142 and the first plug engagement structure 122 structurally match each other. The first plug 12 and the first socket 14 are coupled by the engagement of the first socket engagement structure 142 with the first plug engagement structure 122. Therein, the first plug engagement structure 122 includes a first locking structure 1222, a first driving part 1224, a first rotation-restraining structure 1226, and a first limitation structure 1228. The first plug body 120 has a first fluid passage 120a. The first locking structure 1222 is disposed on the first plug body 120. The first driving part 1224 is movably disposed on the first plug body 120. The first rotation-restraining structure 1226 is disposed on the first driving part 1224. The first limitation structure 1228 is disposed on the first plug body 120 and the first driving part 1224 for limiting rotation or axially sliding of the first driving part 1224 relative to the first plug body 120. The first socket engagement structure 142 includes a second locking structure 1422 and a second rotation-restraining structure 1424. The first socket body 140 has a second fluid passage 140a. The second locking structure 1422 is disposed on the first socket body 140 and includes a first retaining ring 14222. The first retaining ring 14222 is movably disposed on the first socket body 140. The position of the first retaining ring 14222 relative to the first socket body 140 determines whether the second locking structure 1422 is in a locked state or an unlocked state. The second rotation-restraining structure 1424 is disposed on the first retaining ring 14222. The first plug 12 and the first socket 14 are firmly and effectively coupled by the engagement of the first locking structure 1222 with the second locking structure 1422.

In the first embodiment, the first socket 14 is installed on a structural wall 4 (shown schematically as a rectangular block in the figures). The first retaining ring 14222 is sleeved on the first socket body 140 and can move between a locking position (referring to FIG. 4 or FIG. 5, in which the second locking structure 1422 is at the locked state) and an unlocked position (referring to FIG. 6 and FIG. 7, in which the second locking structure 1422 is at the unlocked state) on the first socket body 140. The first locking structure 1222 is a recess, which is realized by an annular groove formed on the outside of the first plug body 120. The second locking structure 1422 further includes at least one locating part 14224 (realized by four locating balls in this embodiment). The first socket body 140 correspondingly forms at least one sliding slot 140b for the locating part 14224 to slide therein. When the locating part 14224 enters the recess and the first retaining ring 14222 is located at the locking position, the first retaining ring 14222 will constrain the locating part 14224 to remain stuck in the recess, so that the first locking structure 1222 and the second locking structure 1422 are firmly engaged with each other. In practice, the engagement of the first locking structure 1222 with the second locking structure 1422 can also be realized by other engagement structures, which will not be described in addition.

The first limitation structure 1228 includes a first limiting post 12282 and a first limiting slot 12284. The first limiting post 12282 is disposed on the first plug body 120. The first limiting slot 12284 is disposed on the first driving part 1224. The first limiting post 12282 relatively slides in the first limiting slot 12284 to limit rotation or axially sliding of the first driving part 1224 relative to the first plug body 120. That is, the interaction between the first limiting post 12282 and the first limiting slot 12284 is used to limit rotation or axially sliding of the first driving part 1224 relative to the first plug body 120. Therein, the first plug body 120 as a whole is slightly cylindrical, and has an axis 120b (indicated by a chain line in FIG. 1 and FIG. 2). The first fluid passage 120a extends along the axis 120b. The first limiting slot 12284 includes an axial slot section 12284a (extending parallel to the axis 120b) and a transverse slot section 12284b (extending perpendicular to the axis 120b) connecting with the axial slot section 12284a. When the first limiting post 12282 relatively slides in the axial slot section 12284a, the first driving part 1224 limitedly moves parallel to the axis 120b (i.e., axially slides relative to the first plug body 120); when the first limiting post 12282 relatively slides in the transverse slot section 12284b, the first driving part 1224 limitedly rotates about the axis 120b (i.e., rotates relative to the first plug body 120).

Through the interaction between the first rotation-restraining structure 1226 and the second rotation-restraining structure 1424, the first rotation-restraining structure 1226 and the second rotation-restraining structure 1424 can be relatively rotated in a single direction. In the first embodiment, the first rotation-restraining structure 1226 is a ratchet, disposed on the outer side of the first driving part 1224; the second rotation-restraining structure 1424 is a pawl, pivotally connected to the inner side of the first retaining ring 14222. Through the interaction between the pawl and the ratchet, the first rotation-restraining structure 1226 is restrained by the second rotation-restraining structure 1424 to rotate relative to the second rotation-restraining structure 1424 in a first rotation direction R1 (indicated by an arrow in FIG. 1) (i.e., the first rotation-restraining structure 1226 can only be rotated in single one direction). Therein, it is practicable to use a restoring part 1424a (e.g. a spring) against the pawl so as to make the pawl keep catching the ratchet.

Figure 4:
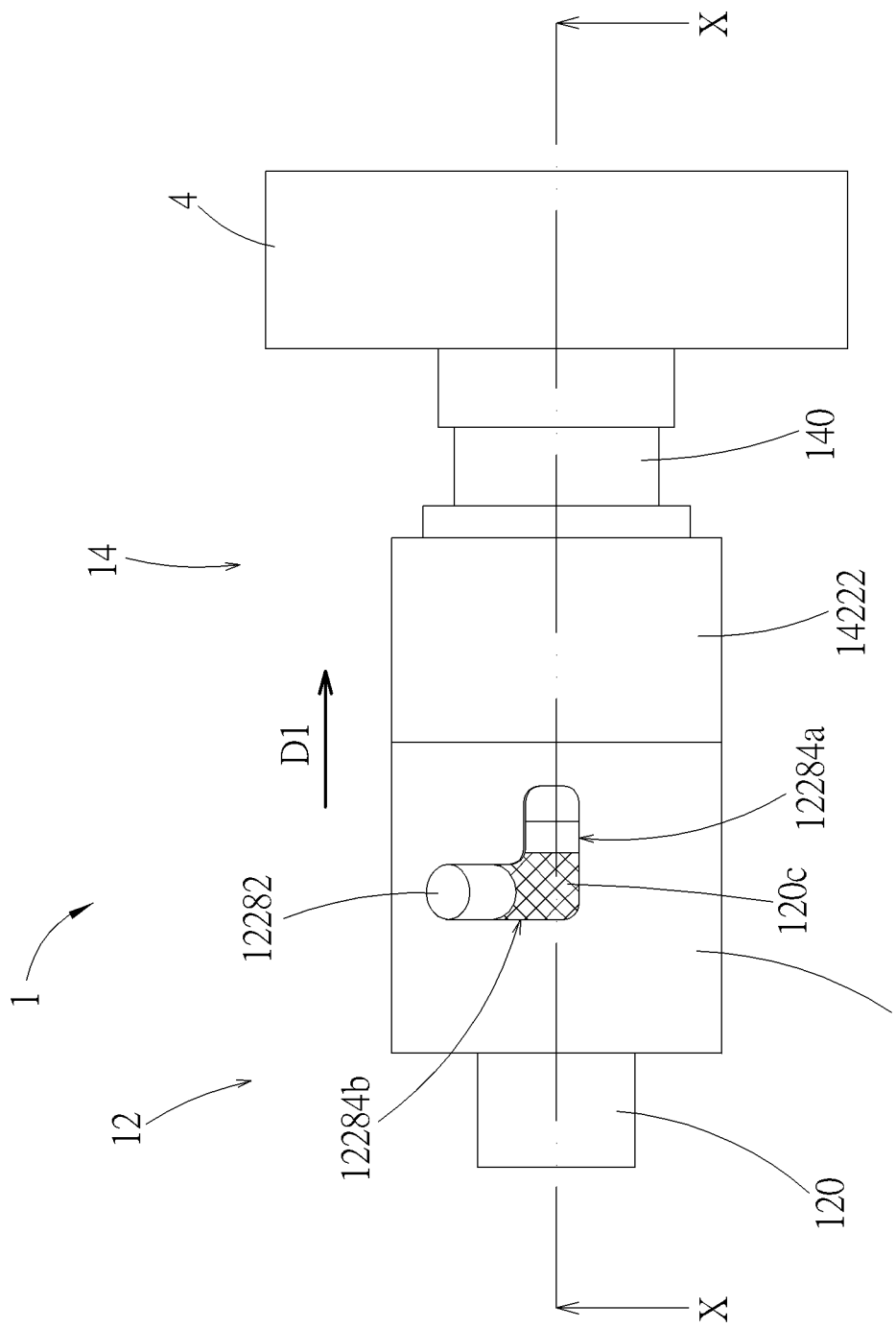
FIG. 4 is a schematic diagram illustrating the first quick coupling set in FIG. 1 when the first plug just contacts the first socket.
Figure 5:
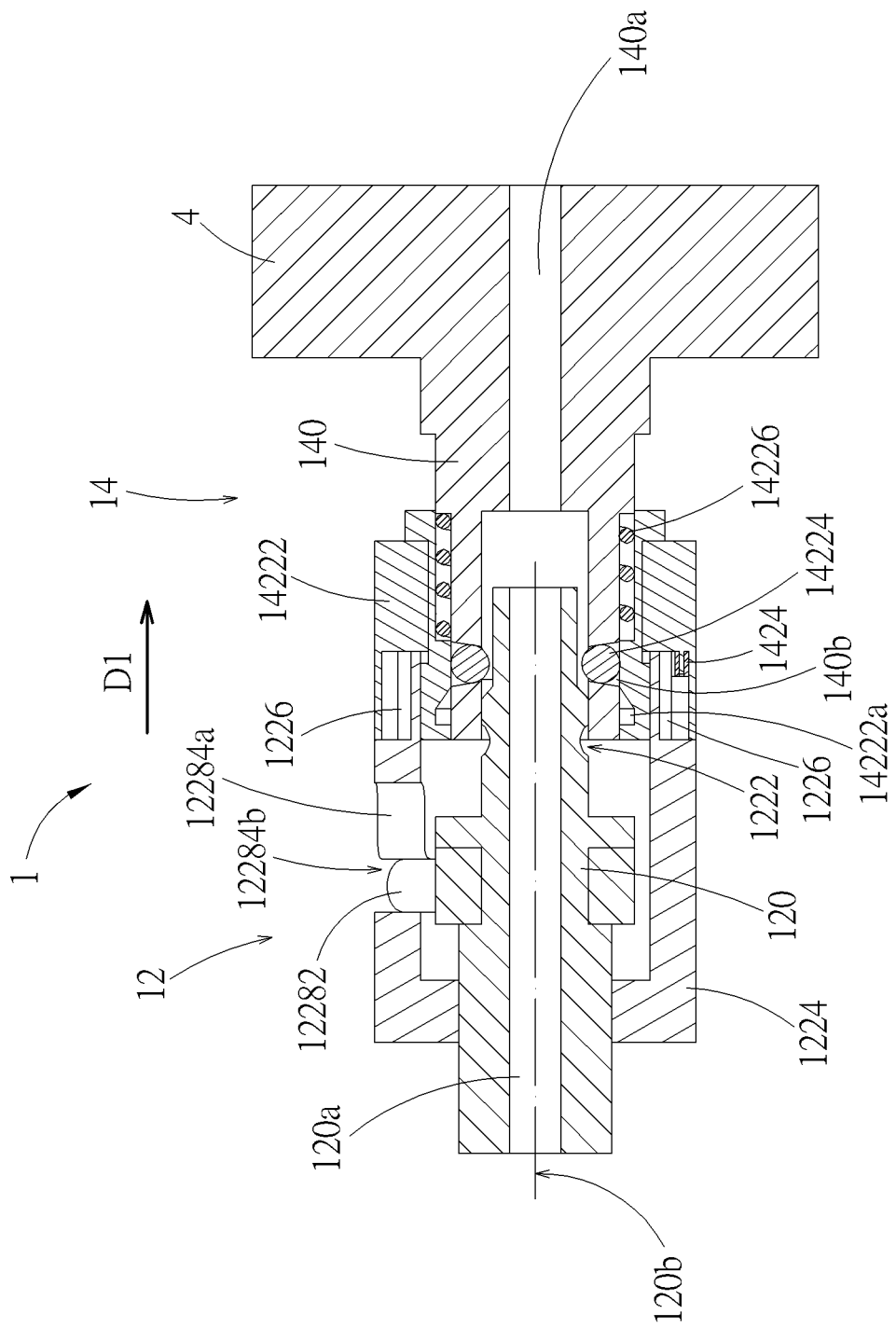
FIG. 5 is a sectional view of the first quick coupling set along the line X-X in FIG. 4.

In the first quick coupling set 1, the first plug 12 is operable to couple with the first socket 14, so that the first locking structure 1222 and the second locking structure 1422 are engaged with each other and the first fluid passage 120*a* and the second fluid passage 140*a* are connected to each other. In practice, if an operator needs to insert the first plug 12 into the first socket 14, as shown by FIG. 1, the operator can first move the first plug 12 close to the first socket 14 in a first insertion direction D1 (indicated by an arrow in the figures), so that the first driving part 1224 contacts the first retaining ring 14222 (as shown by FIG. 4 and FIG. 5). At this moment, the first retaining ring 14222 is located at the locking position.

Figure 6:
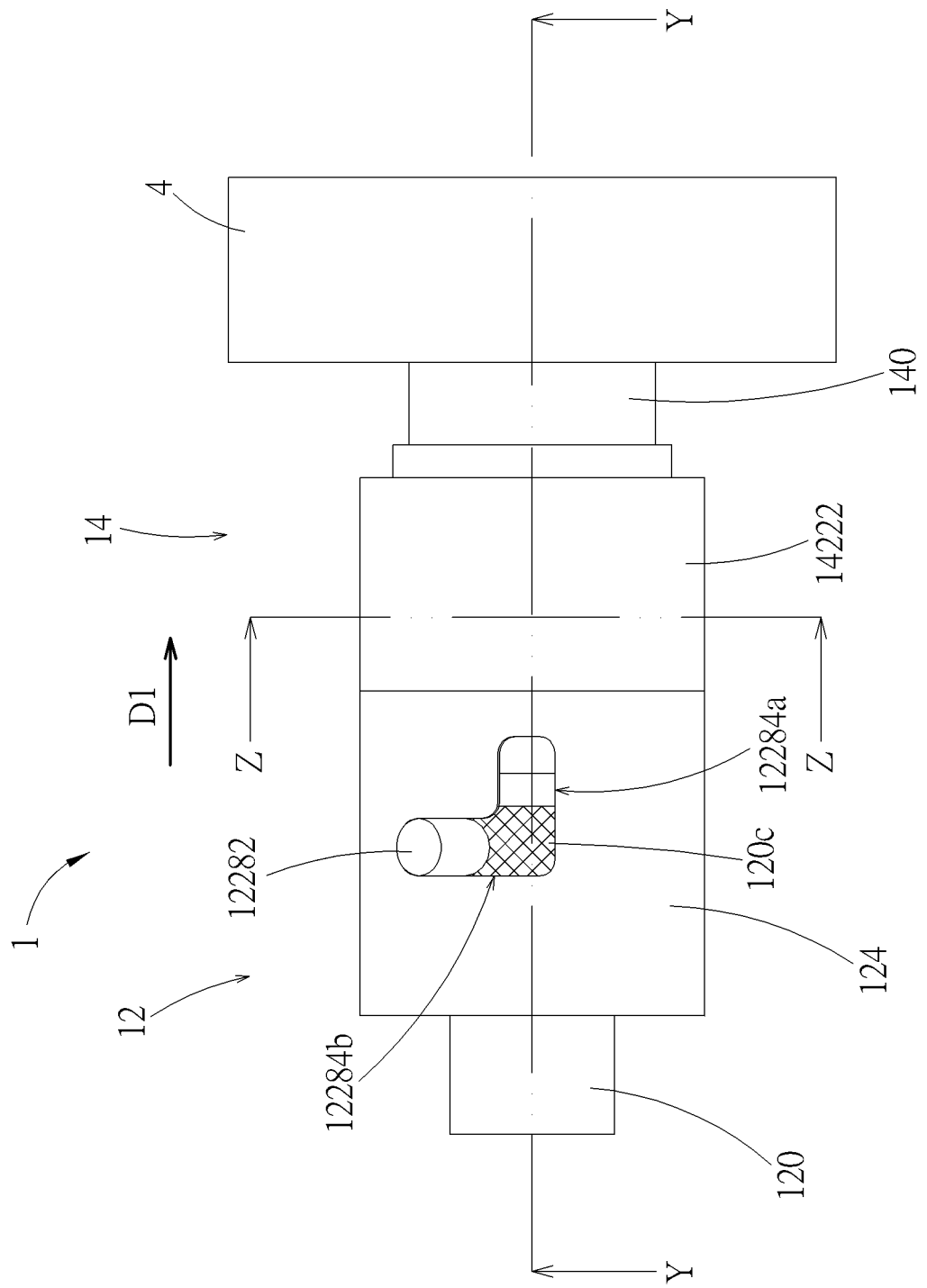
FIG. 6 is a schematic diagram illustrating the first quick coupling set in FIG. 4 when a first driving part of the first plug pushes a first retaining ring of the first socket to an unlocked position.
Figure 7:
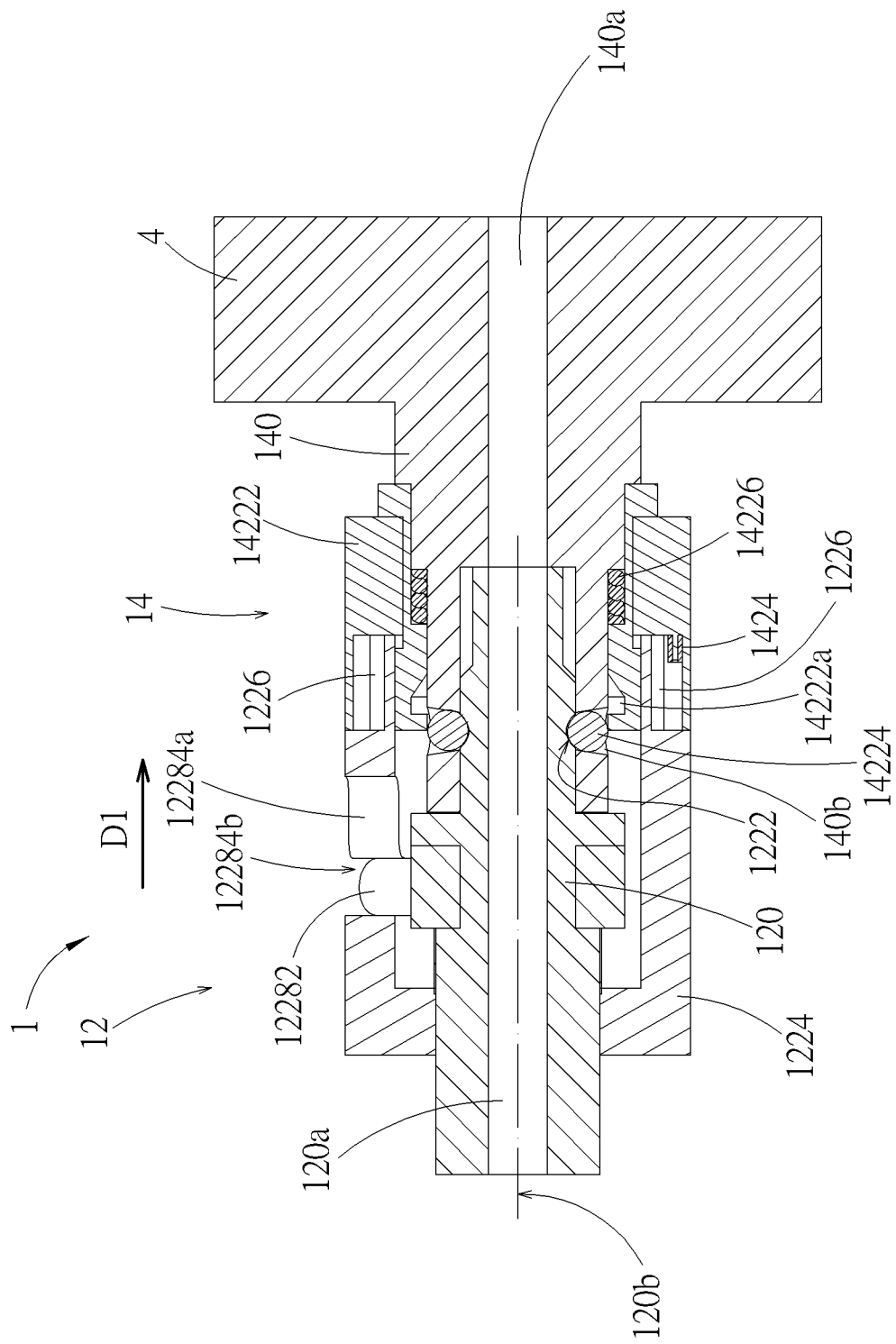
FIG. 7 is a sectional view of the first quick coupling set along the line Y-Y in FIG. 6.
Figure 8:
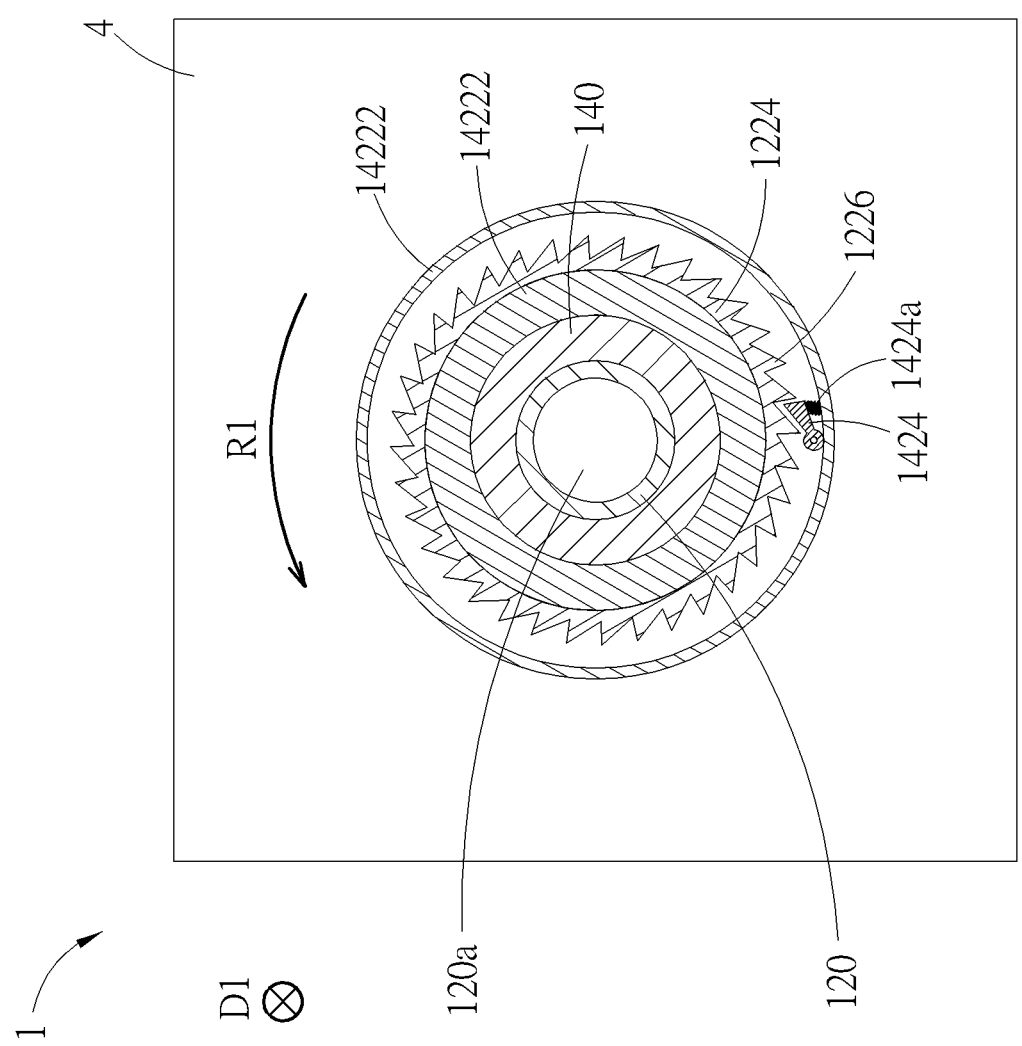
FIG. 8 is a sectional view of the first quick coupling set along the line Z-Z in FIG. 6.

Then, the operator can make the first driving part 1224 push the first retaining ring 14222 in the first insertion direction D1 until the first retaining ring 14222 reaches the unlocking position, so that the first rotation-restraining structure 1226 is engaged with the second rotation-restraining structure 1424 and the first fluid passage 120*a* is connected with the second fluid passage 140*a*, as shown by FIG. 6 to FIG. 8. Therein, the first retaining ring 14222 has a relief slot 14222*a* (e.g., an annular recess on the inner side surface) at its inner side, for the locating part 14224 to retreat to avoid structural interference with the first plug body 120 during the movement of the first retaining ring 14222 in the first insertion direction D1. Furthermore, the first rotation-restraining structure 1226 is located at a front end of the first driving part 1224. When the first driving part 1224 just contacts the first retaining ring 14222, the first rotation-restraining structure 1226 has entered the inner side of the first retaining ring 14222 and engaged with the second rotation-restraining structure 1424 (i.e., the pawl catches the ratchet), as shown by FIG. 5. In practice, it is practicable to design the structure of the first quick coupling set 1 so that the first rotation-restraining structure 1226 is not engaged with the second rotation-restraining structure 1424 until the first retaining ring 14222 reaches the unlocking position, which will not be described in addition. Furthermore, as shown by FIG. 8, through the interaction between the pawl and the ratchet, the first rotation-restraining structure 1226 can only be rotated counterclockwise relative to the second rotation-restraining structure 1424 (i.e., rotated in the first rotation direction R1).

Figure 9:
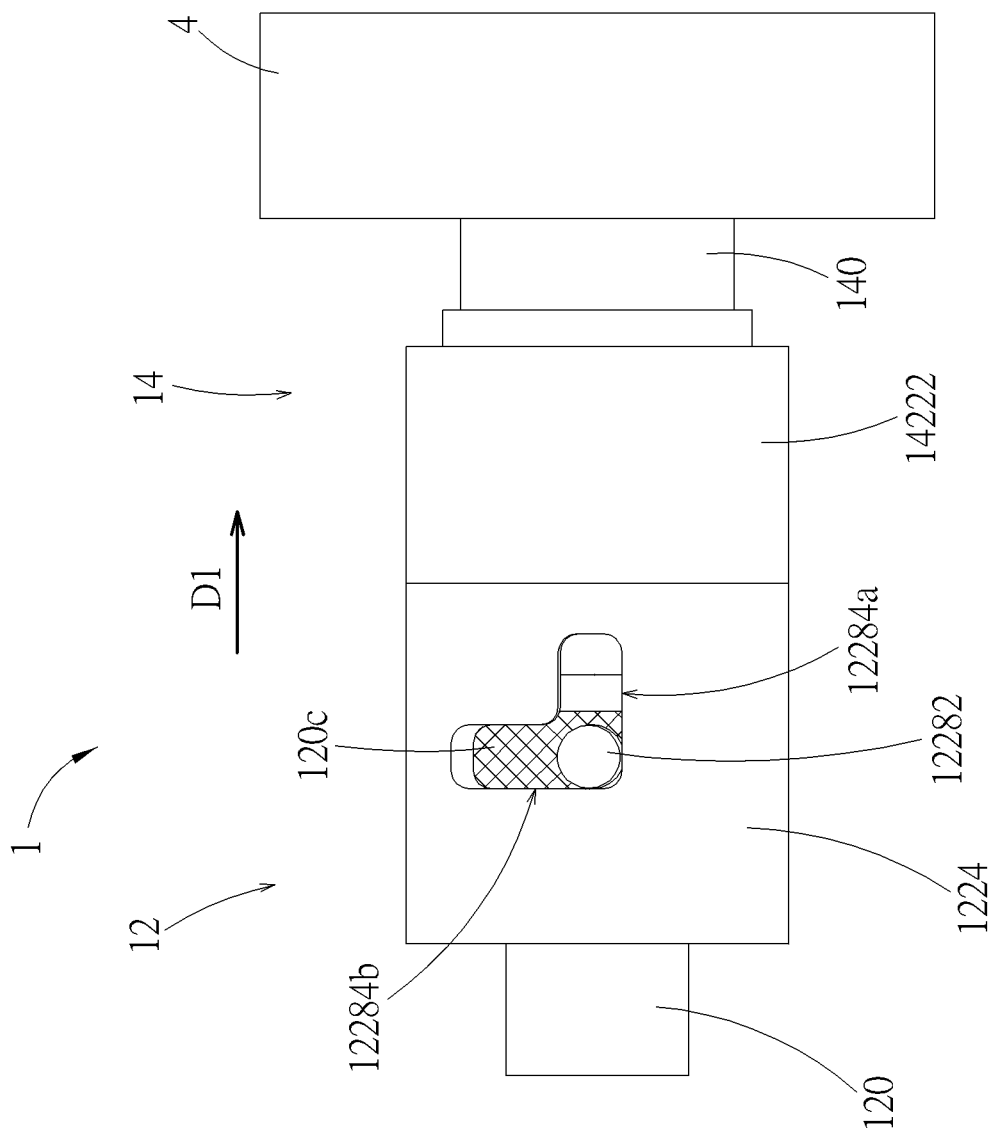
FIG. 9 is a schematic diagram illustrating the first quick coupling set in FIG. 6 after the first driving part of the first plug is rotated.
Figure 10:
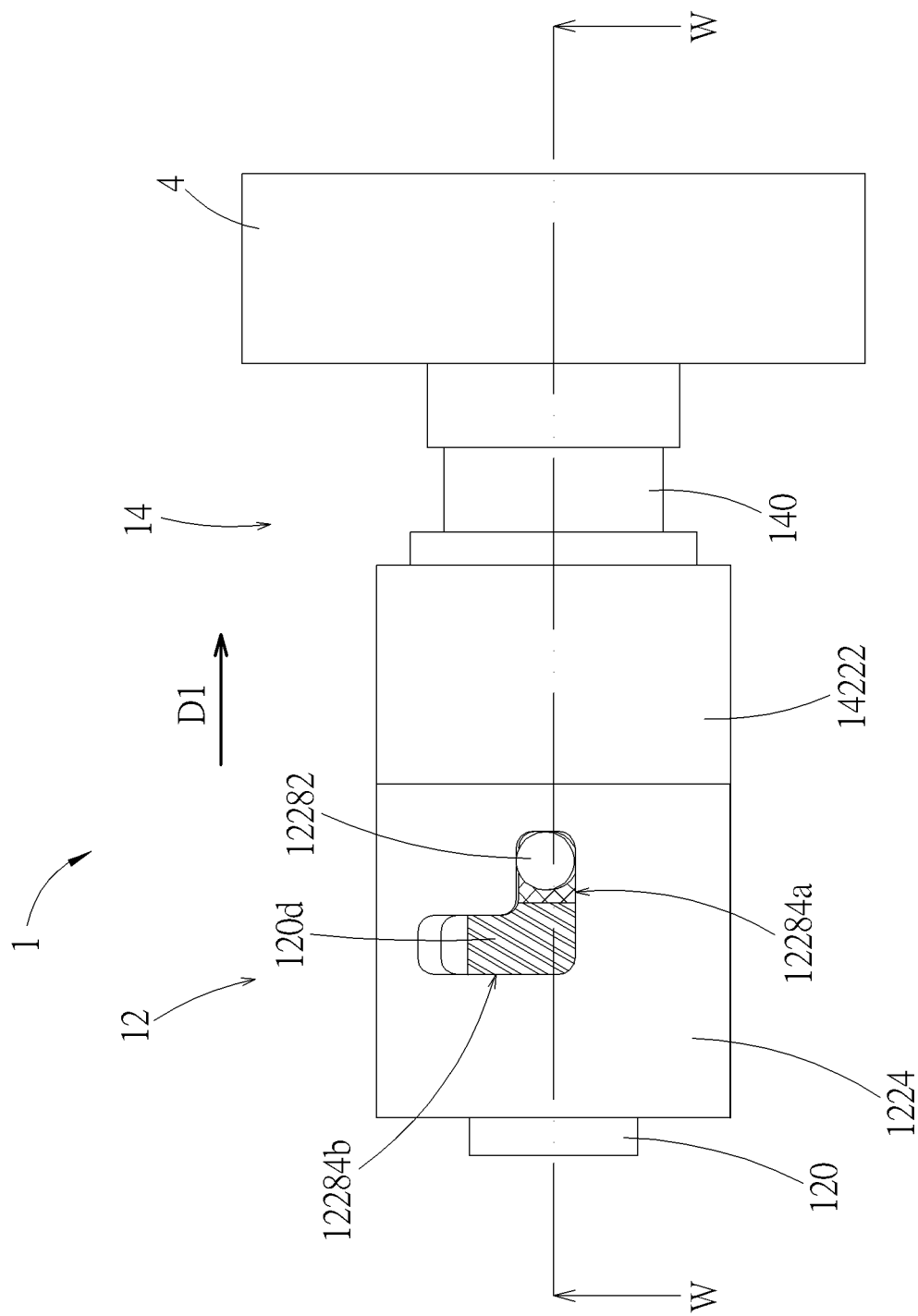
FIG. 10 is a schematic diagram illustrating the first quick coupling set in FIG. 1 after the coupling of the first plug with the first socket is completed.
Figure 11:
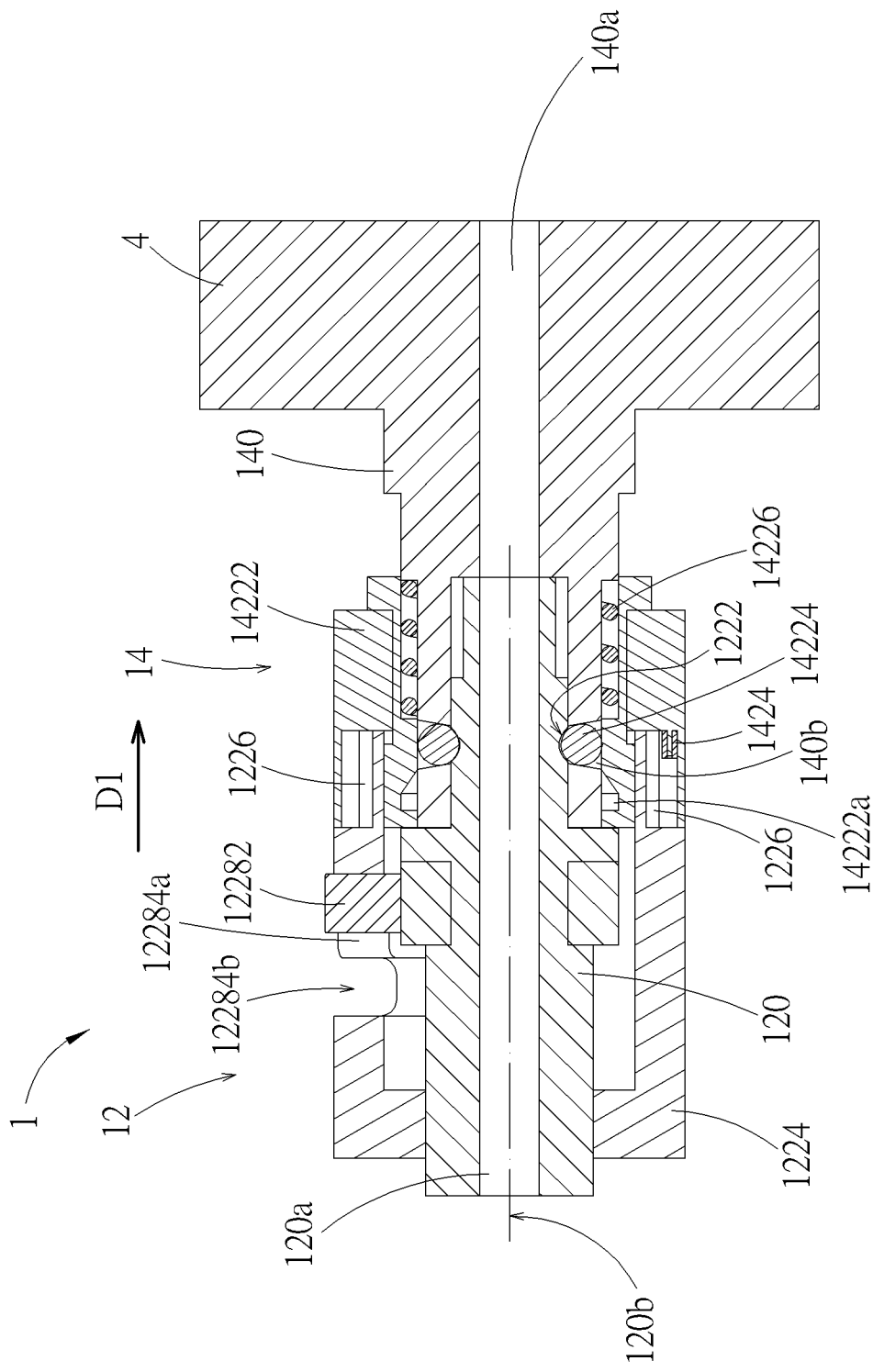
FIG. 11 is a sectional view of the first quick coupling set along the line W-W in FIG. 10.

Then, the operator can rotate the first driving part 1224 to make the first rotation-restraining structure 1226 rotate relative to the second rotation-restraining structure 1424 in the first rotation direction R1 (in which, at this moment, the first limiting post 12282 relatively slides in the transverse slot section 12284*b*), until the first limitation structure 1228 allows the first driving part 1224 to axially slide relative to the first plug body 120 (i.e., the first limiting post 12282 enters the axial slot section 12284*a*), as shown by FIG. 9. Then, the first retaining ring 14222 moves together with the first driving part 1224 in the direction opposite to the first insertion direction D1, until the first retaining ring 14222 reaches the locking position, as shown by FIG. 10 and FIG. 11. At this moment, the first retaining ring 14222 will constrain the locating part 14224 to remain stuck in the recess (i.e. the first locking structure 1222), so that the first locking structure 1222 and the second locking structure 1422 are firmly engaged with each other, and then the coupling of the first plug 12 with the first socket 14 is completed, so that the fluid passage 120*a* and the second fluid passage 140*a* are connected to each other.

Figure 3:
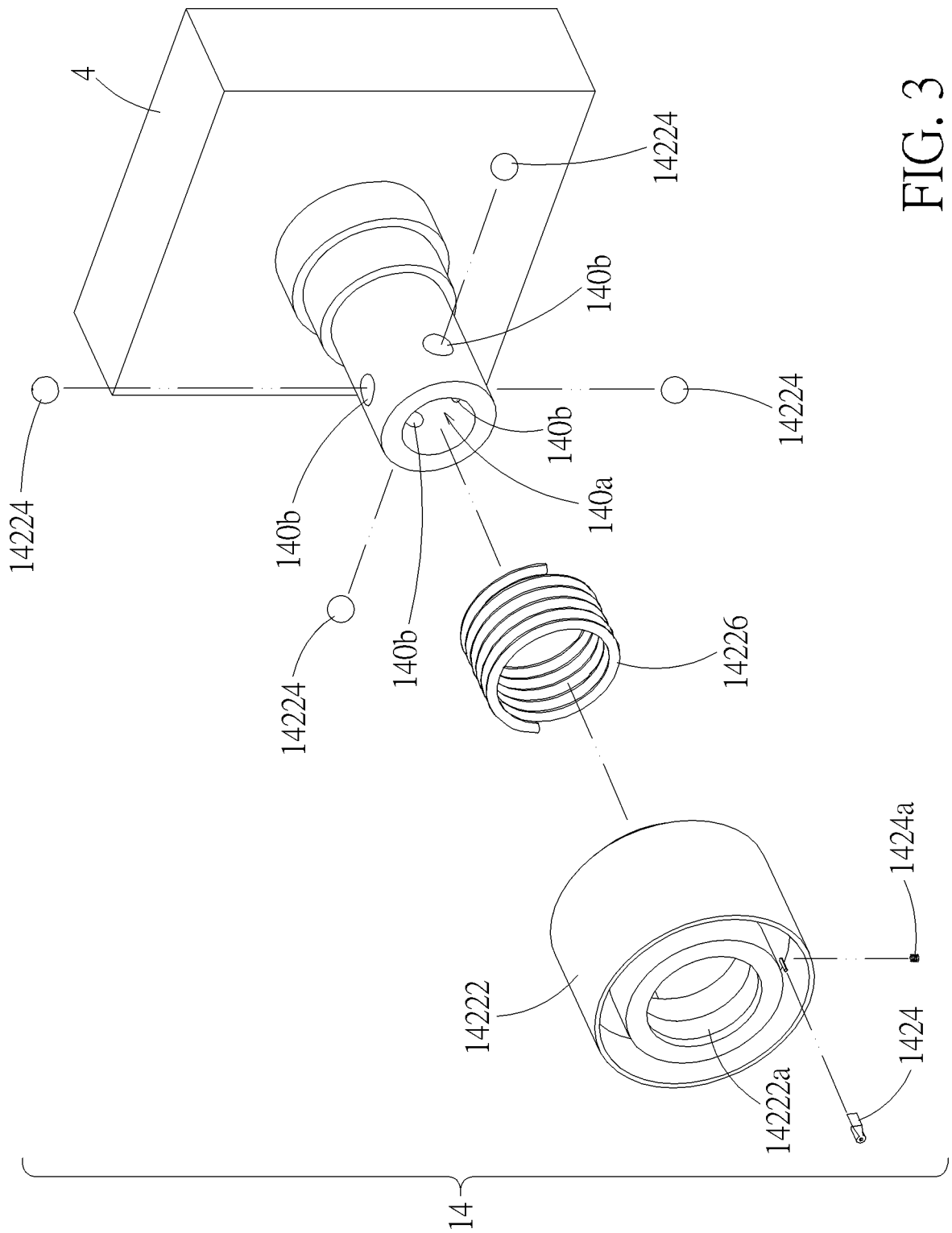
FIG. 3 is a partially-exploded view of a first socket in FIG. 1.

In addition, as shown by FIG. 3 and FIG. 4, in the first embodiment, the second locking structure 1422 further includes a restoring part 14226 (e.g. a spring), connected to the first socket body 140 and the first retaining ring 14222 for driving the first retaining ring 14222 to move toward the locking position. Thereby, in the movement of the first driving part 1224 from the position shown as FIG. 9 to the position shown as FIG. 10 (or FIG. 11), the first retaining ring 14222 can automatically abut against the first driving part 1224 and move together with the first driving part 1224 (in the direction opposite to the first insertion direction D1) under the reset effect of the restoring part 14226. Therefore, in the operation of coupling the first plug 12 with the first socket 14, the operator can perform the operation with one hand, which facilitates the coupling operation. For example, when the first driving part 1224 is located at the position shown as FIG. 9, the operator can only move the first driving part 1224 (in the direction opposite to the first insertion direction D1), or directly release the first driving part 1224, both of which can make the first retaining ring 14222 and the first driving part 1224 move together in the direction opposite to the first insertion direction D1, so as to complete the coupling of the first plug 12 with the first socket 14.

Figure 2:
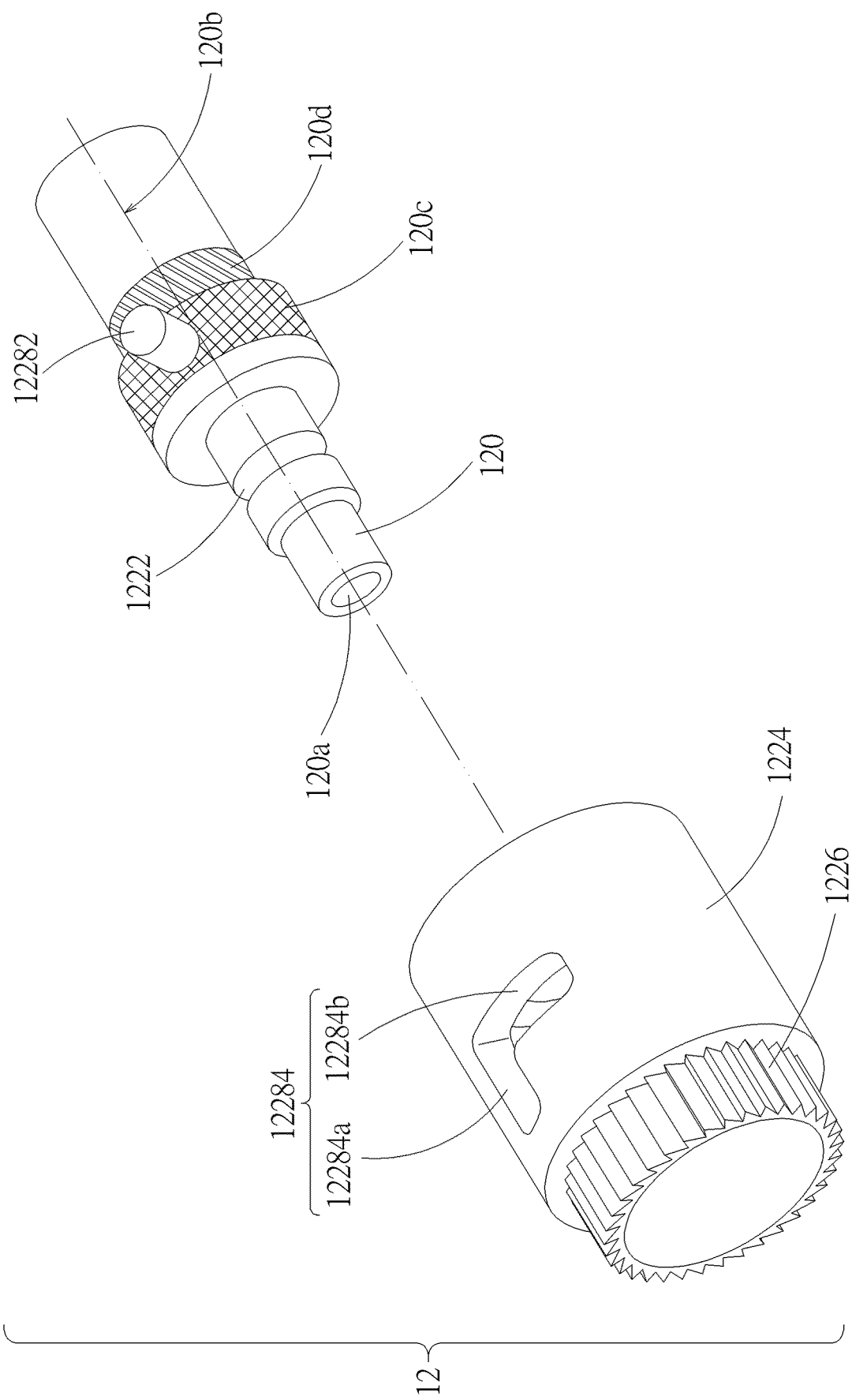
FIG. 2 is a partially-exploded view of a first plug in FIG. 1 in another view point.

Furthermore, as shown by FIG. 2, in the first embodiment, the first limiting slot 12284 is L-shaped, which is convenient for the first limiting post 12282 to be positioned relative to the first limiting slot 12284 during the rotation of the first driving part 1224. For example, the first limiting post 12282 relatively slides from a closed end of the transverse slot section 12284*b* to another end of the transverse slot section 12284*b*, that is, entering the axial slot section 12284*a*, which facilitates a blind operation of the operator (i.e., the operator does not need to visually confirm the rotation status of the first driving part 1224 when rotating the first driving part 1224). Furthermore, the first limiting slot 12284 is a through slot, formed on the first driving part 1224. The first limiting post 12282 is fixed on the first plug body 120 and exposed from the through slot. Therefore, at least one indication mark can be disposed on the first plug body 120 or the first driving part 1224 to indicate the relative position of the first limiting post 12282 and the first driving part 1224. Thereby, the first limiting slot 12284 can selectively expose one of the indication marks according to the position of the first limiting post 12282 relative to the first limiting slot 12284. In the first embodiment, two marks 120*c* and 120*d* of different colors (indicated by different grid lines in the figures) are formed on the first plug body 120 as the indication marks. For example, as shown by FIG. 4, before the first plug 12 is coupled with the first socket 14, the operator can see the mark 120*c* through the first limiting slot 12284. As shown by FIG. 10, after the first plug 12 is coupled with the first socket 14, the operator can see the mark 120*d* through the first limiting slot 12284. In practice, it is practicable to form marks (such as nicks, marks, or colored nicks or marks) beside the first driving part 1224 and first limiting slot 12284, which can also indicate to the operator where the first limiting post 12282 is located relative to the first limiting slot 12284.

Furthermore, as shown by FIG. 1 and FIG. 2, the first limiting slot 12284 is disposed on the first driving part 1224 and the first limiting post 12282 is disposed on the first plug body 120, so as to limit the rotation and axially sliding of the first driving part 1224 relative to the first plug body 120. In practice, it is practicable to dispose the first limiting slot 12284 on the first plug body 120 and dispose the first limiting post 12282 on the first driving part 1224, which can also make the limitation to the rotation and axially sliding of the first driving part 1224 relative to the first plug body 120, which will not be described in addition.

In addition, as shown by FIG. 1, the ratchet of the first rotation-restraining structure 1226 is disposed on the outer side of the first driving part 1224 (similar to an external gear in structural logic), and the pawl of the second rotation-restraining structure 1424 is disposed on the inner side of the first retaining ring 14222 correspondingly. In practice, the ratchet of the first rotation-restraining structure 1226 can be changed to be disposed on the inner side of the first driving part 1224 (similar to an internal gear in structural logic), and the pawl of the second rotation-restraining structure 1424 can be disposed on the first retaining ring 14222 or the first socket body 140 correspondingly (for example, the first socket body 140 can be structurally designed so that when the first retaining ring 14222 is located at the locking position, there is a portion of the structure still protruding from the first retaining ring 14222, so that the pawl can be disposed on this portion of the structure and engage with the ratchet). In this case, the interaction between the ratchet and the pawl can also limit the first rotation-restraining structure 1226 and the second rotation-restraining structure 1424 to relatively rotate in one single direction. Furthermore, in practice, the first rotation-restraining structure 1226 can be changed to be realized by a pawl, and the second rotation-restraining structure 1424 is realized by a ratchet correspondingly. In this case, the interaction between the ratchet and the pawl can also limit the first rotation-restraining structure 1226 and the second rotation-restraining structure 1424 to relatively rotate in one single direction.

As discussed above, in the first quick coupling set 1 according to the first embodiment, the first rotation-restraining structure 1226 of the first plug 12 structurally matches the second rotation-restraining structure 1424 of the socket 14, so in principle, the first plug 12 can only be firmly and effectively coupled to the first socket 14, and vice versa. Therefore, the structural match of the first rotation-restraining structure 1226 and the second rotation-restraining structure 1424 has the effect of preventing misconnection.

Figure 12:
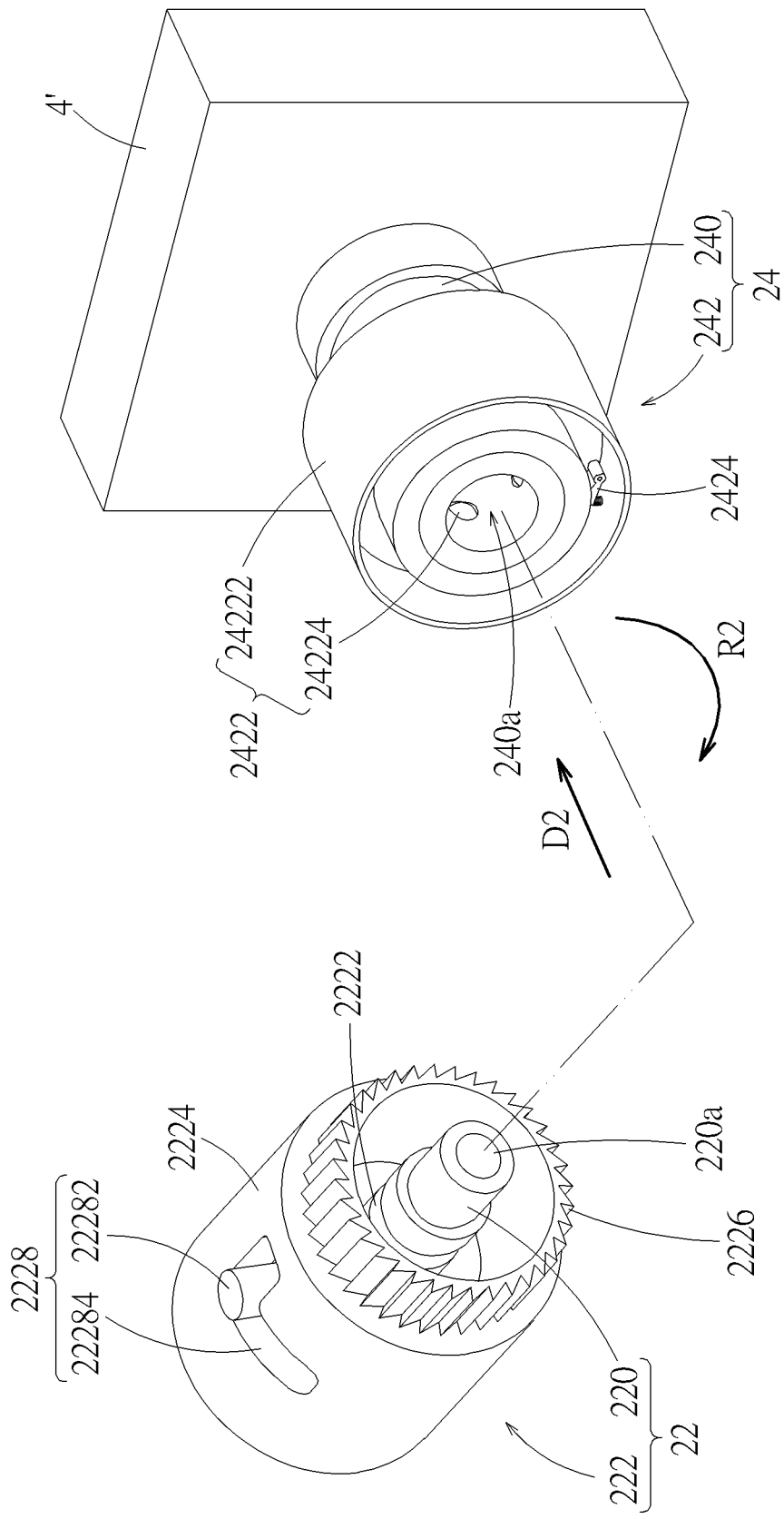
FIG. 12 is a schematic diagram illustrating a second quick coupling set of a second embodiment according to the present application.

Please refer to FIG. 12. A first quick coupling set 2 of a second embodiment according to the present application includes a second plug 22 and a second socket 24 matching the second plug 22. For simplification of description, the second plug 22 and the second socket 24 are structurally similar to the first plug 12 and the first socket 14, respectively. For other descriptions of the second plug 22 and the second socket 24, please refer to the relevant descriptions and corresponding figures about the components of the first plug 12 and the first socket 14 and variants thereof, which will not be described in addition.

In the second embodiment, the second plug 22 is installed on a structural wall 4' and includes a second plug body 220 and a second plug engagement structure 222 disposed on the second plug body 220. The second plug body 220 is structurally identical to the first plug body 120. The second plug engagement structure 222 includes a third locking structure 2222, a second driving part 2224, a third rotation-restraining structure 2226, and a second limitation structure 2228. The second plug body 220 has a third fluid passage 220a. The third locking structure 2222 is disposed on the second plug body 220. The second driving part 2224 is movably disposed on the second plug body 220. The third rotation-restraining structure 2226 is disposed on the second driving part 2224. The second limitation structure 2228 is disposed on the second plug body 220 and the second driving part 2224 for limiting axially sliding or rotation of the second driving part 2224 relative to the second plug body 220. Therein, the second limitation structure 2228 includes a second limiting post 22282 and a second limiting slot 22284, disposed on the second plug body 220 and the second driving part 2224, respectively.

The second socket 24 includes a second socket body 240 and a second socket engagement structure 242 disposed on the second socket body 240. The second socket body 240 is structurally identical to the first socket body 140. The second socket engagement structure 242 structurally matches the second plug engagement structure 222. The second socket engagement structure 242 includes a fourth locking structure 2422 and a fourth rotation-restraining structure 2424. The second socket body 240 has a fourth fluid passage 240a. The fourth locking structure 2422 is disposed on the second socket body 240 and includes a second retaining ring 24222 and at least one locating part 24224. The second retaining ring 24222 is movably disposed on the second socket body 240. The position of the second retaining ring 24222 relative to the second socket body 240 determines whether the fourth locking structure 2422 is in a locked state or an unlocked state. The fourth rotation-restraining structure 2424 is disposed on the second retaining ring 24222. Similarly, the second plug 22 can be inserted into the second socket 24 in a second insertion direction D2 (indicated by an arrow in the figure), and the second plug 22 can be firmly and effectively coupled with the second socket 24 through the engagement of the third locking structure 2222 and the fourth locking structure 2422.

Figure 13:
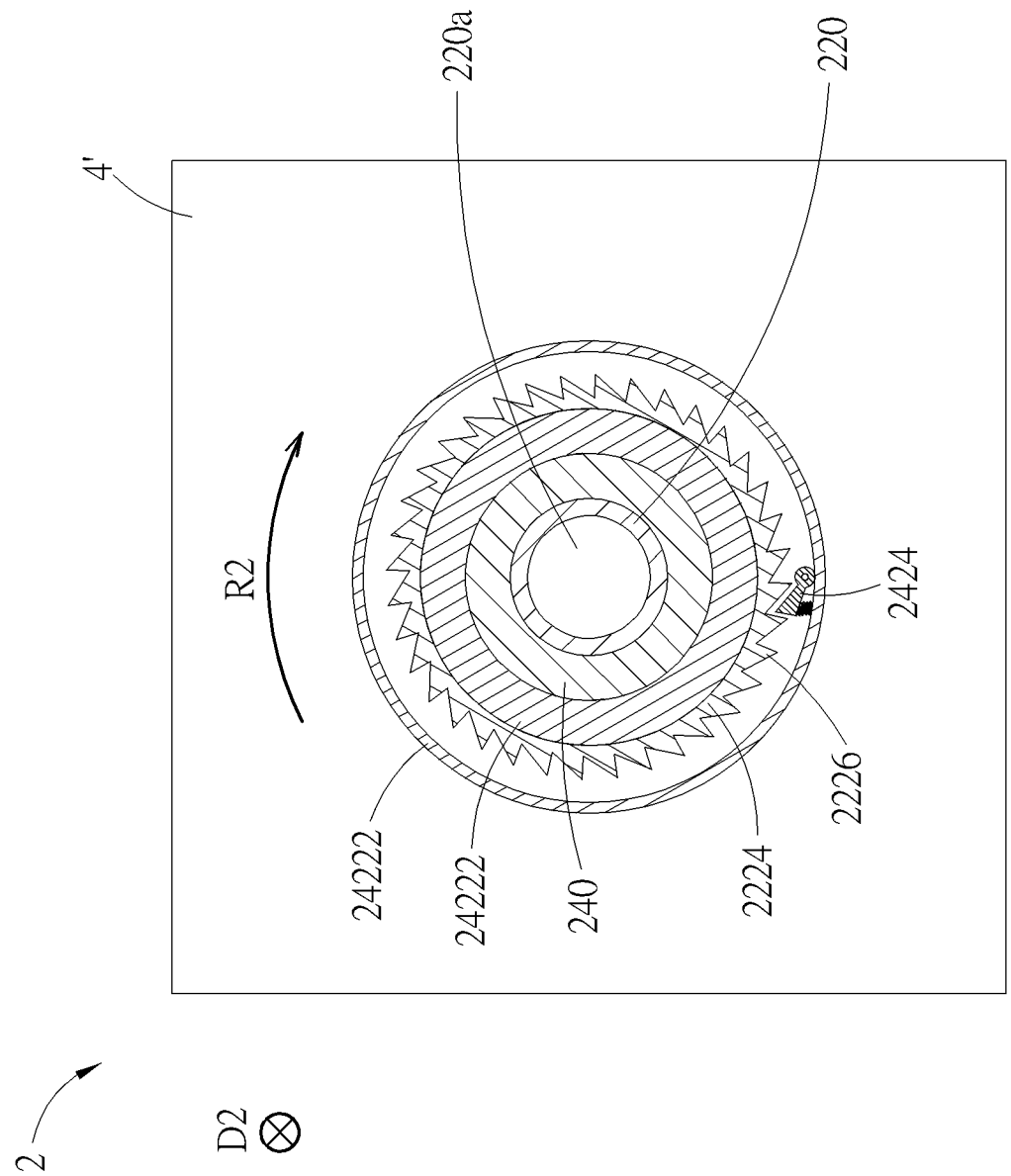
FIG. 13 is a sectional view of the second quick coupling set in FIG. 12 when a second driving part of a second plug pushes a second retaining ring of a second socket to an unlocked position; therein, the cutting plane is equivalent to the line Z-Z in FIG. 6.

As shown by FIG. 12 and FIG. 13, the main difference between the second plug 22 and the first plug 12 is that the third rotation-restraining structure 2226 (also realized by a ratchet) of the second plug 22 and the first rotation-restraining structure 1226 (i.e. the ratchet) of the first plug 12 are different in the tooth shape direction. Correspondingly, the main difference between the second socket 24 and the first socket 14 is that the fourth rotation-restraining structure 2424 (also realized by a pawl) of the second socket 24 and the second rotation-restraining structure 1424 (i.e. the pawl) of the first socket 14 are configured in different orientations. Therefore, the third rotation-restraining structure 2226 is restrained by the fourth rotation-restraining structure 2424 to rotate relative to the fourth rotation-restraining structure 2424 in a second rotation direction R2 (indicated by an arrow in the figure) (i.e., the third rotation-restraining structure 226 can only be rotated in single one direction), so as to couple the second plug 22 with the second socket 24, so that the third fluid channel 220a is connected with the fourth fluid channel 240a. In addition, in the second plug 22, the second limiting slot 22284 of the second limitation structure 2228 is also L-shaped, but is configured in the opposite direction to the first limiting slot 12284 of the first limitation structure 1228, for matching the rotation direction of the third rotation-restraining structure 2226 relative to the fourth rotation-restraining structure 2424. Therein, the first rotation direction R1 and the second rotation direction R2 are different.

Please refer to FIG. 8 and FIG. 13 together. The pawl of the fourth rotation-restraining structure 2424 and the pawl of the second rotation-restraining structure 1424 are configured in different orientations, so in principle, even if the ratchet of the third rotation-restraining structure 2226 is inserted into the first socket 14 and meshed with the pawl of the second rotation-restraining structure 1424, the third rotation-restraining structure 2226 still cannot rotate relative to the second rotation-restraining structure 1424 in the first rotation direction R1 like the first rotation-restraining structure 1226. This structural feature makes the second plug 22 unable to be effectively coupled with the first socket 14 correctly, thus preventing misconnection. Similarly, the first plug 12 also cannot be coupled with the second socket 24, which can also prevent misconnection.

Figure 14:
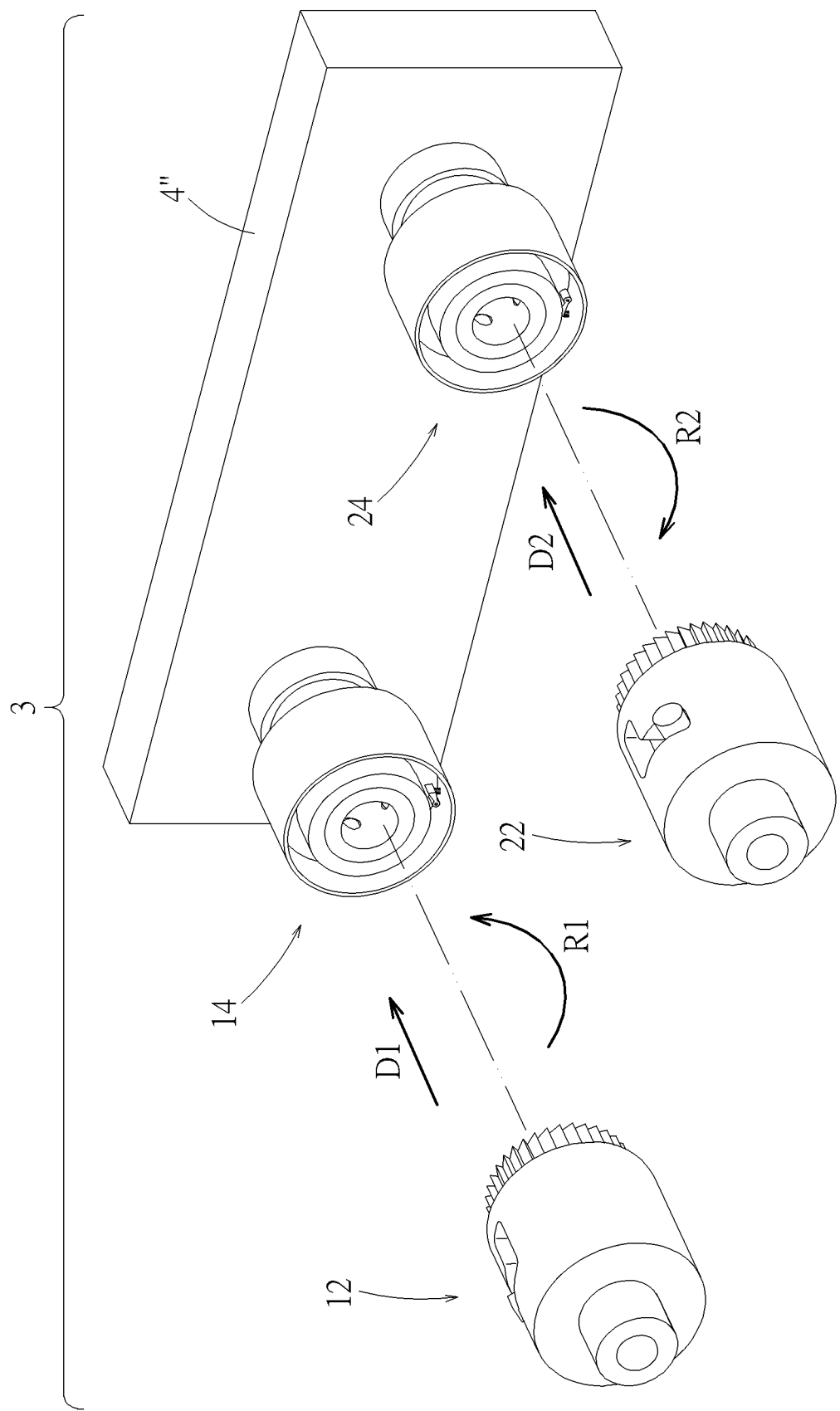
FIG. 14 is a schematic diagram illustrating a third quick coupling set of a third embodiment according to the present application.

Please refer to FIG. 14. A third quick coupling set 3 of a third embodiment according to the present application includes the above-mentioned first quick coupling set 1 and second quick coupling set 2. For example, the third quick coupling set 3 can be used in a server cooling system. Therein, the first socket 14 and the second socket 24 are installed on a structural wall 4" of a cooling distribution unit (CDU) and serve as an outlet and an inlet, respectively. The first plug 12 and the second plug 22 are respectively connected to the inlet and outlet of a water-cooled plate through pipes. According to the previous description, through the rotation restraint effect among the rotation-restraining structures 1226, 1424, 2226 and 2424, the first plug 12 can only be firmly and effectively connected with the first socket 14, the second plug 22 can only be firmly and effectively connected with the second socket 24, so the misconnection in the prior art can be avoided.

Figure 15:
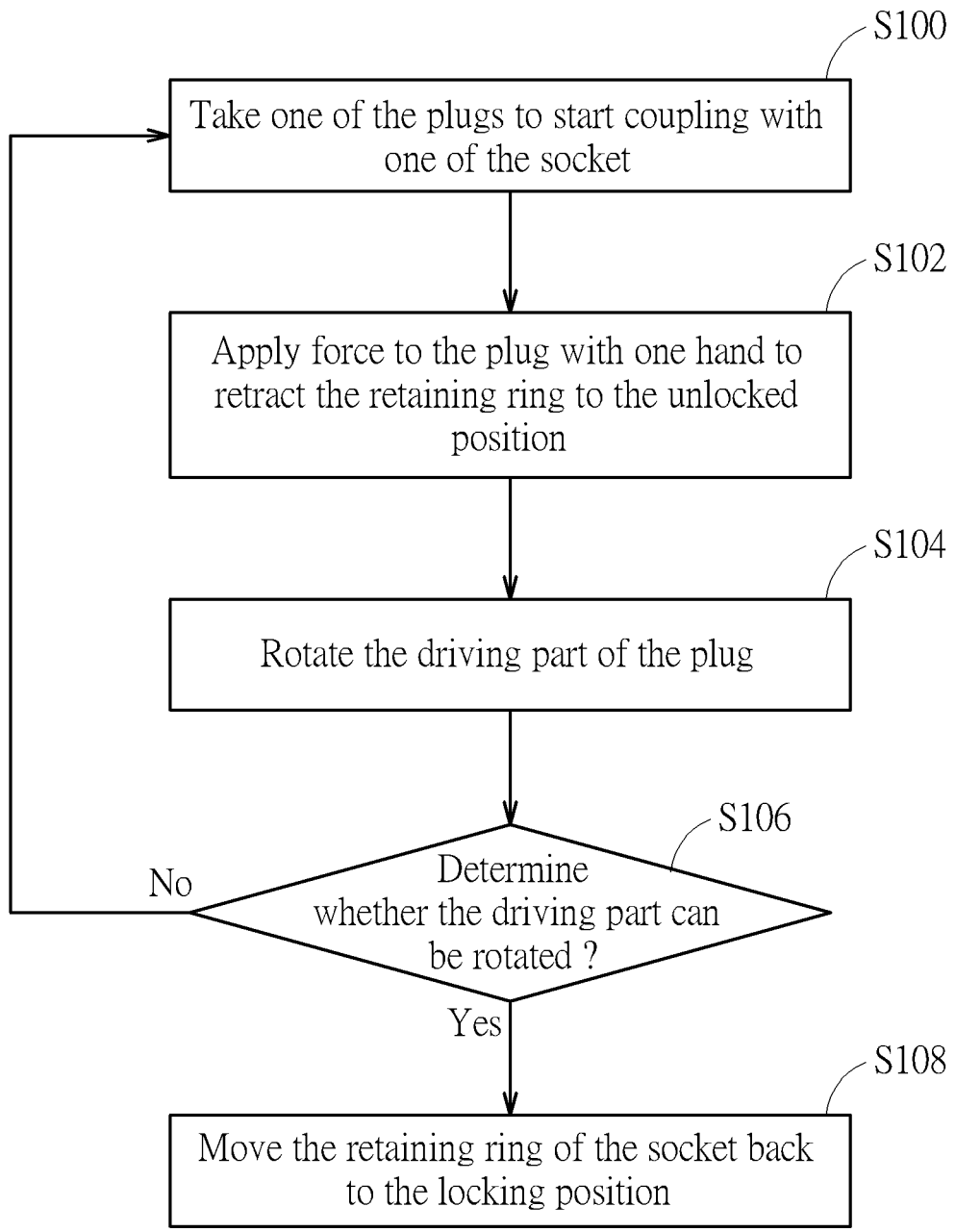
FIG. 15 is a flow chart of the coupling operation between plugs and sockets in the third quick coupling set of FIG. 14.

In practical applications, the operation for coupling the first plug 12 (inlet) and the second plug 22 (outlet) with the first socket 14 (outlet) and the second socket 24 (inlet) in the third quick coupling set 3 can be performed according to the flow chart shown in FIG. 15. As shown by the step S100, one of the plugs is taken to start coupling with one of the socket. As shown by the step S102, the operator can apply force to the plug with one hand to retract the retaining ring to the unlocked position. Then, as shown by the step S104, the operator rotates the driving part of the plug. As shown by the step S106, the operator needs to determine whether the driving part can be rotated. If NO, it means that the plug does not match the socket and they cannot be coupled with each other firmly and effectively. The flow returns to the step S100. The other of the plugs is taken and the steps S102, S104 and S106 are repeated. If YES, the retaining ring of the socket is moved back to the locking position, as shown by the step S108; at this moment, the coupling of the plug with the socket is completed, and the operator can observe the corresponding indication mark (e.g. the mark 120*d*) from the limiting slot on the plug. The coupling of other plugs is carried out according to the above flow chart until the coupling of all plugs is completed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A quick coupling set, comprising:
 a first plug, the first plug comprising a first plug body, a first driving part, and a first rotation-restraining structure, the first driving part and the first rotation-restraining structure being disposed on the first plug body, the first driving part being movably disposed on the first plug body, the first rotation-restraining structure being disposed on the first driving part, the first plug comprising a limitation structure, the limitation structure comprises a limiting post and a limiting slot, one of the limiting post and the limiting slot being disposed on the first driving part, the other of the limiting post and the limiting slot being disposed on the first plug body, the limiting post relatively sliding in the limiting slot to limit rotation or axially sliding of the first driving part relative to the first plug body; and
 a first socket, the first socket comprising a first socket body and a second rotation-restraining structure disposed on the first socket body, the first socket and first plug structurally fitting each other, the first rotation-restraining structure being restrained by the second rotation-restraining structure to rotate relative to the second rotation-restraining structure in a first rotation direction.

2. The quick coupling set according to claim 1, wherein the limiting slot comprises an axial slot section and a transverse slot section connecting with the axial slot section, the limiting post slides relative to the axial slot section so that the first driving part is limited to axially slide relative to the first plug body, and the limiting post slides relative to the transverse slot section so that the first driving part is limited to rotate relative to the first plug body.

3. The quick coupling set according to claim 2, wherein the limiting slot is L-shaped.

4. The quick coupling set according to claim 1, wherein the limiting slot is a through slot formed on the first driving part, the limiting post is fixed on the first plug body and exposed from the through slot, and two indication marks are disposed on the first plug body or the first driving part to indicate a relative position of the limiting post and the limiting slot.

5. The quick coupling set according to claim 4, wherein the two indication marks are two different colored marks, formed on the first plug body, and the limiting slot exposes one of the two indication marks according to a position of the limiting post relative to the limiting slot.

6. The quick coupling set according to claim 1, wherein one of the first rotation-restraining structure and the second rotation-restraining structure comprises a ratchet, and the other of the first rotation-restraining structure and the second rotation-restraining structure comprises a pawl.

7. The quick coupling set according to claim 1, further comprising:
 a second plug, the second plug comprising a second plug body, a second driving part, and a third rotation-restraining structure, the second driving part and the third rotation-restraining structure being disposed on the second plug body, the second driving part being movably disposed on the second plug body, the third rotation-restraining structure being disposed on the second driving part, the second plug body being identical in structure to the first plug body; and
 a second socket, the second socket comprising a second socket body and a fourth rotation-restraining structure disposed on the second socket body, the second socket body being identical in structure to the first socket body, the second socket and second plug structurally fitting each other, the third rotation-restraining structure being restrained by the fourth rotation-restraining structure to rotate relative to the fourth rotation-restraining structure in a second rotation direction;
 wherein the first rotation direction is the opposite to the second rotation direction.

8. A quick coupling set, comprising:
 a first plug, the first plug comprising a first plug body, a first driving part, and a first rotation-restraining structure, the first driving part and the first rotation-restraining structure being disposed on the first plug body, the first driving part being movably disposed on the first plug body, the first rotation-restraining structure being disposed on the first driving part, the first plug comprising a limitation structure, the limitation structure comprising a limiting post and a limiting slot, one of the limiting post and the limiting slot being disposed on the first driving part, the other of the limiting post and the limiting slot being disposed on the first plug body, the limiting post relatively sliding in the limiting slot to limit rotation or axially sliding of the first driving part relative to the first plug body; and a first socket, the first socket comprising a first socket body, a retaining ring movably disposed on the first socket body, and a second rotation-restraining structure disposed on a radially inner side of the retaining ring, the first socket and first plug structurally fitting each other, the first rotation-restraining structure being restrained by the second rotation-restraining structure to rotate relative to the second rotation-restraining structure in a first rotation direction.

9. The quick coupling set according to claim 8, wherein the limiting slot comprises an axial slot section and a transverse slot section connecting with the axial slot section, the limiting post slides relative to the axial slot section so that the first driving part is limited to axially slide relative to the first plug body, and the limiting post slides relative to the transverse slot section so that the first driving part is limited to rotate relative to the first plug body.

10. The quick coupling set according to claim 9, wherein the limiting slot is L-shaped.

11. The quick coupling set according to claim 8, wherein the limiting slot is a through slot formed on the first driving part, the limiting post is fixed on the first plug body and exposed from the through slot, and two indication marks are disposed on the first plug body or the first driving part to indicate a relative position of the limiting post and the limiting slot.

12. The quick coupling set according to claim 11, wherein the two indication marks are two different colored marks, formed on the first plug body, and the limiting slot exposes one of the two indication marks according to a position of the limiting post relative to the limiting slot.

13. The quick coupling set according to claim 8, wherein one of the first rotation-restraining structure and the second rotation-restraining structure comprises a ratchet, and the other of the first rotation-restraining structure and the second rotation-restraining structure comprises a pawl.

14. A quick coupling set, comprising:
a first plug, the first plug comprising a first plug body, a first driving part, and a first rotation-restraining structure, the first driving part and the first rotation-restraining structure being disposed on the first plug body, the first driving part being movably disposed on the first plug body, the first rotation-restraining structure being disposed on the first driving part;
a first socket, the first socket comprising a first socket body, a retaining ring movably disposed on the first socket body, and a second rotation-restraining structure disposed on a radially inner side of the retaining ring, the first socket and first plug structurally fitting each other, the first rotation-restraining structure being restrained by the second rotation-restraining structure to rotate relative to the second rotation-restraining structure in a first rotation direction;
a second plug, the second plug comprising a second plug body, a second driving part, and a third rotation-restraining structure, the second driving part and the third rotation-restraining structure being disposed on the second plug body, the second driving part being movably disposed on the second plug body, the third rotation-restraining structure being disposed on the second driving part, the second plug body being identical in structure to the first plug body; and
a second socket, the second socket comprising a second socket body and a fourth rotation-restraining structure disposed on the second socket body, the second socket body being identical in structure to the first socket body, the second socket and second plug structurally fitting each other, the third rotation-restraining structure being restrained by the fourth rotation-restraining structure to rotate relative to the fourth rotation-restraining structure in a second rotation direction;
wherein the first rotation direction is the opposite to the second rotation direction.

* * * * *